United States Patent
Katsuta et al.

(10) Patent No.: US 12,547,797 B2
(45) Date of Patent: Feb. 10, 2026

(54) SIMULATION APPARATUS, CONTROL METHOD OF SIMULATION APPARATUS, AND COMPUTER-READABLE STORAGE MEDIUM

(71) Applicant: CANON KABUSHIKI KAISHA, Tokyo (JP)

(72) Inventors: Ken Katsuta, Saitama (JP); Yuichiro Oguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 820 days.

(21) Appl. No.: 17/944,449

(22) Filed: Sep. 14, 2022

(65) Prior Publication Data

US 2023/0103748 A1   Apr. 6, 2023

(30) Foreign Application Priority Data

Oct. 1, 2021 (JP) .................................. 2021-163067
Jul. 13, 2022 (JP) .................................. 2022-112574

(51) Int. Cl.
*G06F 30/20* (2020.01)
*G06F 113/26* (2020.01)

(52) U.S. Cl.
CPC .......... *G06F 30/20* (2020.01); *G06F 2113/26* (2020.01)

(58) Field of Classification Search
CPC .. G06F 30/20; G06F 2113/26; G06F 2113/22; G06F 2119/18; G06F 3/14; G06F 9/451; G03F 7/0002
See application file for complete search history.

(56) References Cited

U.S. PATENT DOCUMENTS

| | | | |
|---|---|---|---|
| 2007/0118341 A1* | 5/2007 | Tamaoki | C23C 14/54 703/2 |
| 2017/0263510 A1* | 9/2017 | Baba | H01L 21/0271 |
| 2021/0350047 A1 | 11/2021 | Asano et al. | |

FOREIGN PATENT DOCUMENTS

| | | |
|---|---|---|
| JP | 2012212833 A | 11/2012 |
| JP | 2020123719 A | 8/2020 |
| KR | 1020160117214 A | 10/2016 |

(Continued)

OTHER PUBLICATIONS

Seki, Junichi, et al. "Enabling nanoimprint simulator for quality verification; Process-design co-optimization toward high volume manufacturing." Design-Process-Technology Co-optimization for Manufacturability XIV. vol. 11328. SPIE, 2020. (Year: 2020).*

*Primary Examiner* — Chuen-Meei Gan
(74) *Attorney, Agent, or Firm* — ROSSI, KIMMS & McDOWELL LLP (57) ABSTRACT

A simulation apparatus predicts a behavior of a curable composition in a formation process in which the curable composition arranged on a shot region of a substrate and a mold are brought into contact with each other to form a film of the curable composition on the shot region. The apparatus includes a processor configured to obtain the behavior of the curable composition by simulation computation, and output data used to display a simulation image simulating the behavior obtained by the simulation computation. The simulation image includes information of an outer periphery of the shot region and information of an edge portion of the film, which are drawn in a mode that enables visual identification of a position of the edge portion of the film with respect to the outer periphery.

11 Claims, 8 Drawing Sheets

(56) References Cited

FOREIGN PATENT DOCUMENTS

| KR | 1020190051814 A | 5/2019 |
| KR | 1020210113050 A | 9/2021 |

* cited by examiner

FIG. 8A  TIME t1

FIG. 8B  TIME t2

FIG. 8C  TIME t3

SIMULATION APPARATUS, CONTROL METHOD OF SIMULATION APPARATUS, AND COMPUTER-READABLE STORAGE MEDIUM

BACKGROUND OF THE INVENTION

Field of the Invention

The present invention relates to a simulation apparatus, a control method of the simulation apparatus, and a computer-readable storage medium.

Description of the Related Art

There is a film forming technique of forming a film made of a curable composition on a substrate by arranging the curable composition on the substrate, bringing the curable composition into contact with a mold, and curing the curable composition. Such film forming technique is applied to an imprint technique and a planarization technique. In the imprint technique, by using a mold having a pattern region, the pattern of the mold is transferred to a curable composition on a substrate by bringing the curable composition on the substrate into contact with the pattern region of the mold and curing the curable composition. In the planarization technique, by using a mold having a flat surface, a film having a flat upper surface is formed by bringing a curable composition on a substrate into contact with the flat surface and curing the curable composition.

The curable composition is arranged in the form of droplets on the substrate, and the mold is then pressed against the droplets of the curable composition. This spreads the droplets of the curable composition on the substrate, thereby forming a film of the curable composition. At this time, it is important to form a film of the curable composition with a uniform thickness and not to leave bubbles in the film. To achieve this, the arrangement of the droplets of the curable composition, a method and a condition (to be referred to as an imprint condition hereinafter) for pressing the mold against the curable composition, and the like are adjusted. To implement this adjustment operation by trial and error using an apparatus, enormous time and cost are required. To cope with this, the use of a simulator that supports such adjustment operation is desired.

Japanese Patent Laid-Open No. 2020-123719 describes a simulation method advantageous in computing, in a shorter time, the behavior of a curable composition in a process of forming a film of the curable composition. A computational grid formed by a plurality of computational components are defined such that multiple droplets of the curable composition fall within one computational component, and the behavior of the curable composition in each computational component is obtained in accordance with a model corresponding to the state of the curable composition in each computational element. Thus, the higher computational speed is implemented.

Since the computational speed has been increased as described above, simulation can be actively used for adjustment of the actual machine, and trial and error by the actual machine can be reduced.

One of the evaluation items for deciding the imprint condition is the fillability in the outer periphery of a pattern region. A state in which the curable composition is uniformly spread over the entire pattern region is a state in which the fillability is good. The imprint condition is adjusted to achieve this state. If the imprint condition is inappropriate, a state ("an unfilled state") in which the curable composition does not spread to the outer periphery of the pattern region so the pattern cannot be formed normally, and a state ("extrusion") in which the curable composition protrudes outside the pattern region may occur. The pattern in which unfilled and extrusion have occurred is defective. Particularly, if extrusion occurs, a portion thicker than the pattern to be transferred may be generated, and this may affect the etching step performed after the imprint step.

The fillability is evaluated by observing, using a microscope, a pattern formed by actually performing the imprint process on the substrate using a predetermined imprint condition, and checking whether there is no unfilled or extrusion. This method is an evaluation method with high reliability because the actually formed pattern can be directly checked. However, since it is required to execute the imprint process and observe the pattern every time the imprint condition is adjusted, the number of operations increases.

In order to decrease the number of evaluation operations, simulation is utilized. According to simulation, since the formation process of the film of the curable composition can be predicted by computation, it becomes easy to specify the causes of occurrence of unfilled and extrusion, so that it can be expected that the number of adjustment operations of the imprint condition can be decreased. However, if the simulation result cannot be effectively referred to, the condition is not modified properly. Then, the number of imprint processes for checking cannot be decreased as expected, and the number of operations cannot be decreased.

SUMMARY OF THE INVENTION

The present invention provides a simulation technique advantageous in effectively checking a state of filling of a curable composition.

The present invention in its one aspect provides a simulation apparatus that predicts a behavior of a curable composition in a formation process in which the curable composition arranged on a shot region of a substrate and a mold are brought into contact with each other to form a film of the curable composition on the shot region, the apparatus comprising an obtaining unit configured to obtain a condition concerning a simulation of the formation process, and a processor configured to obtain the behavior of the curable composition by simulation computation based on the obtained condition, and output data used to display a simulation image simulating the behavior obtained by the simulation computation, wherein the simulation image includes information of an outer periphery of the shot region and information of an edge portion of the film, which are drawn in a mode that enables visual identification of a position of the edge portion of the film with respect to the outer periphery.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
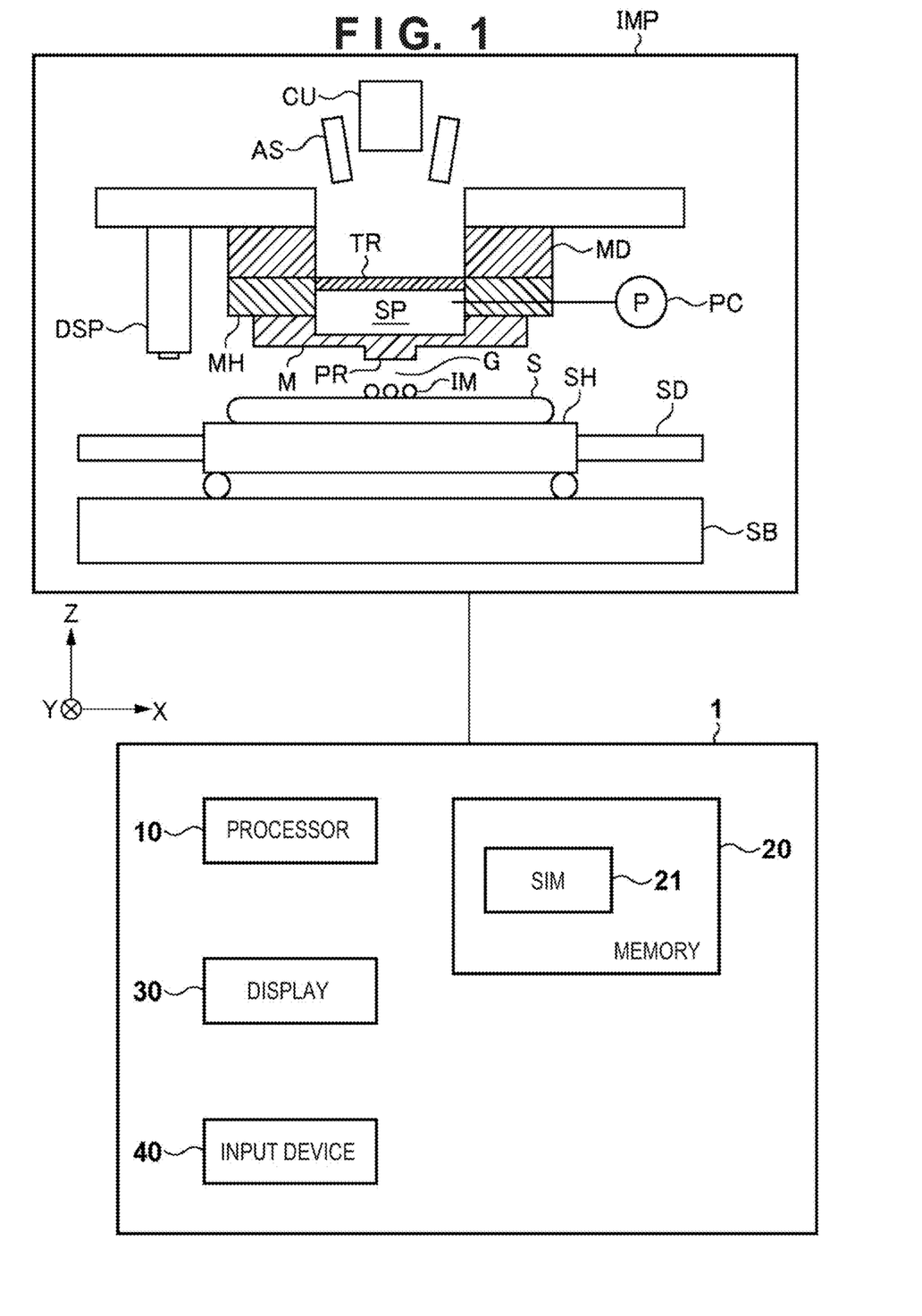
FIG. 1 is a view showing the arrangements of a film forming apparatus and an information processing apparatus.

FIG. 1 is a schematic view showing the arrangements of a film forming apparatus IMP and an information processing apparatus 1 according to an embodiment of the present invention. The film forming apparatus IMP executes a formation process of bringing a plurality of droplets of a curable composition IM arranged on a substrate S into contact with a mold M and forming a film of the curable composition IM in a space between the substrate S and the mold M. The film forming apparatus IMP may be referred to as a molding apparatus. The film forming apparatus IMP may be formed as, for example, an imprint apparatus or a planarization apparatus. The substrate S and the mold M are interchangeable, and a film of the curable composition IM may be formed in the space between the mold M and the substrate S by bringing a plurality of droplets of the curable composition IM arranged on the mold M into contact with the substrate S.

The imprint apparatus uses the mold M having a pattern to transfer the pattern of the mold M to the curable composition IM on the substrate S. The imprint apparatus uses the mold M having a pattern region PR provided with a pattern. As an imprint process, the imprint apparatus brings the curable composition IM on the substrate S into contact with the pattern region PR of the mold M, fills, with the curable composition IM, a space between the mold M and a region where the pattern of the substrate S is to be formed, and then cures the curable composition IM. This transfers the pattern of the pattern region PR of the mold M to the curable composition IM on the substrate S. For example, the imprint apparatus forms a pattern made of a cured product of the curable composition IM in each of a plurality of shot regions of the substrate S.

As a planarization process, using the mold M having a flat surface, the planarization apparatus brings the curable composition IM on the substrate S into contact with the flat surface of the mold M, and cures the curable composition IM, thereby forming a film having a flat upper surface. If the mold M having dimensions (size) that cover the entire region of the substrate S is used, the planarization apparatus forms a film made of a cured product of the curable composition IM on the entire region of the substrate S.

As the curable composition, a material to be cured by receiving curing energy is used. As the curing energy, an electromagnetic wave or heat can be used. The electromagnetic wave includes, for example, light selected from the wavelength range of 10 nm (inclusive) to 1 mm (inclusive) and, more specifically, infrared light, a visible light beam, or ultraviolet light. The curable composition is a composition cured by light irradiation or heating. A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition is, for example, 1 mPa·s (inclusive) to 100 mPa·s (inclusive).

As the material of the substrate, for example, glass, a ceramic, a metal, a semiconductor, a resin, or the like is used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are $\theta X, \theta Y$, and $\theta Z$, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the $\theta X$-axis, the $\theta Y$-axis, and the $\theta Z$-axis means control or driving concerning a rotation about an axis parallel to the X-axis, a rotation about an axis parallel to the Y-axis, and a rotation about an axis parallel to the Z-axis, respectively. In addition, a position is information that is specified based on coordinates on the X-, Y-, and Z-axes, and an orientation is information that is specified by values on the $\theta X$-, $\theta Y$-, and $\theta Z$-axes. Positioning means controlling the position and/or orientation.

The film forming apparatus IMP includes a substrate holding unit SH that holds the substrate S, a substrate driving mechanism SD that moves the substrate S by driving the substrate holding unit SH, and a support base SB that supports the substrate driving mechanism SD. In addition, the film forming apparatus IMP includes a mold holding unit MH that holds the mold M, and a mold driving mechanism MD that moves the mold M by driving the mold holding unit MH.

The substrate driving mechanism SD and the mold driving mechanism MD form a relative movement mechanism that moves at least one of the substrate S and the mold M so as to adjust the relative position between the substrate S and the mold M. Adjustment of the relative position between the substrate S and the mold M by the relative movement mechanism includes driving to bring the curable composition IM on the substrate S into contact with the mold M and driving to separate the mold M from the cured curable composition IM on the substrate S. In addition, adjustment of the relative position between the substrate S and the mold M by the relative movement mechanism includes positioning between the substrate S and the mold M. The substrate driving mechanism SD is configured to drive the substrate S with respect to a plurality of axes (for example, three axes including the X-axis, Y-axis, and θZ-axis, and preferably six axes including the X-axis, Y-axis, Z-axis, θX-axis, θY-axis, and θZ-axis). The mold driving mechanism MD is configured to drive the mold M with respect to a plurality of axes (for example, three axes including the Z-axis, θX-axis, and θY-axis, and preferably six axes including the X-axis, Y-axis, Z-axis, θX-axis, θY-axis, and θZ-axis).

The film forming apparatus IMP includes a curing unit CU for curing the curable composition IM with which the space between the substrate S and the mold M is filled. For example, the curing unit CU cures the curable composition IM on the substrate S by applying the curing energy to the curable composition IM via the mold M.

The film forming apparatus IMP includes a transmissive member TR for forming a space SP on the rear side (the opposite side of a surface opposing the substrate S) of the mold M. The transmissive member TR is made of a material that transmits the curing energy from the curing unit CU, and can apply the curing energy to the curable composition IM on the substrate S.

The film forming apparatus IMP includes a pressure control unit PC that controls deformation of the mold M in the Z-axis direction by controlling the pressure of the space SP. For example, when the pressure control unit PC makes the pressure of the space SP higher than the atmospheric pressure, the mold M is deformed in a convex shape toward the substrate S.

The film forming apparatus IMP includes a dispenser DSP for arranging, supplying, or distributing the curable composition IM on the substrate S. However, the substrate S on which the curable composition IM is arranged by another apparatus may be supplied (loaded) to the film forming apparatus IMP. In this case, the film forming apparatus IMP need not include the dispenser DSP.

The film forming apparatus IMP may include an alignment scope AS for measuring a positional shift (alignment error) between the substrate S (or the shot region of the substrate S) and the mold M.

The information processing apparatus 1 that functions as a simulation apparatus executes computation of predicting the behavior of the curable composition IM in a process executed by the film forming apparatus IMP. More specifically, the information processing apparatus 1 executes computation of predicting the behavior of the curable composition IM in the process of bringing the plurality of droplets of the curable composition IM arranged on the substrate S into contact with the mold M and forming a film of the curable composition IM in the space between the substrate S and the mold M.

The information processing apparatus 1 is formed by, for example, incorporating a simulation program 21 in a general-purpose or dedicated computer. Note that the information processing apparatus 1 may be formed by a Programmable Logic Device (PLD) such as a Field Programmable Gate Array (FPGA). Alternatively, the information processing apparatus 1 may be formed by an Application Specific Integrated Circuit (ASIC).

In this embodiment, the information processing apparatus 1 is formed by storing the simulation program 21 in a memory 20 in a computer including a processor 10, the memory 20, a display 30, and an input device 40. The memory 20 may be a semiconductor memory, a disk such as a hard disk, or a memory of another form. The simulation program 21 may be stored in a computer-readable memory medium or provided to the information processing apparatus 1 via a communication facility such as a telecommunication network.

The processor 10 can function as an obtaining unit that obtains the condition (simulation condition) concerning the simulation of the formation process. The processor 10 can also function as a processor that obtains the behavior of the curable composition by simulation computation based on the simulation condition. The processor 10 can further function as a display control unit that controls the display unit (display 30) to display a simulation image simulating the behavior of the curable composition obtained by the simulation computation.

Figure 2:
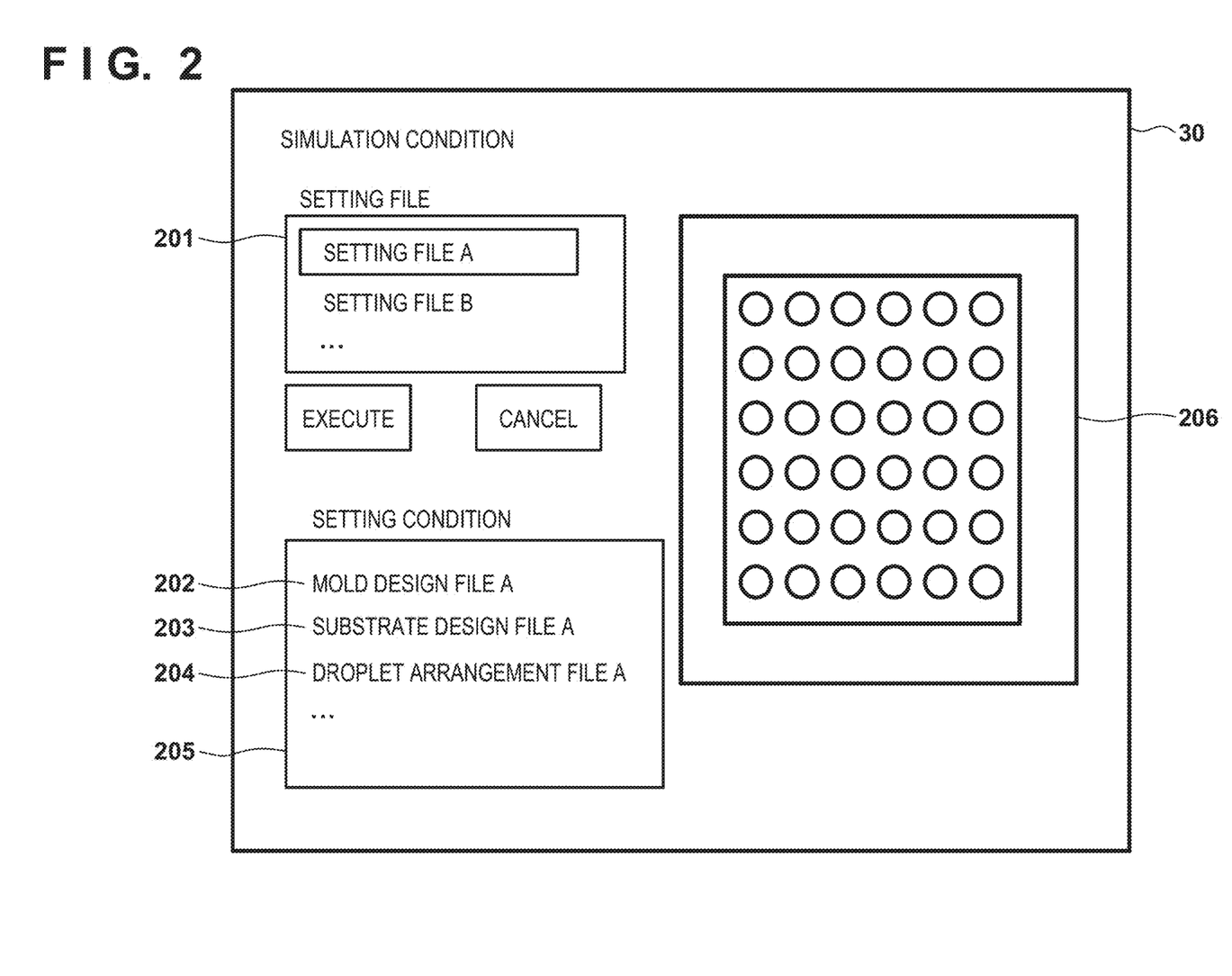
FIG. 2 is a view showing an example of a simulation condition designation screen.

FIG. 2 is a view showing the simulation condition designation screen of a user interface provided (displayed) on the display 30 of the information processing apparatus 1 in association with the simulation method executed by the processor 10 in accordance with the simulation program 21. In this embodiment, as shown in FIG. 2, the simulation for predicting the behavior of the curable composition IM is executed by a user inputting necessary information via the input device 40 while referring to the user interface provided on the display 30.

For example, inputting a simulation condition can include designating one setting file from a plurality of setting files 201 stored in the memory 20 in advance. The setting file is a file that integrates and manages conditions for an imprint process to be simulated. Each setting file can include, as setting conditions, a mold design file 202 including the design information of the mold M, a substrate design file 203 including the design information of the substrate S, and a droplet arrangement file 204 indicating the discharge amounts and arrangement of droplets of the curable composition IM.

Note that in this embodiment, for the sake of descriptive convenience, as the setting conditions concerning the conditions for the imprint process designated in the setting file 201, three specific files (the mold design file 202, the substrate design file 203, and the droplet arrangement file 204) are shown. However, a condition for the imprint process not shown in this embodiment may also be set as the setting condition, and a file thereof may be created and stored in the memory 20 to form a library.

Normally, the file stored in the memory 20 in advance is used as each file designated in the setting file 201. By storing a plurality of files in the memory 20 and forming a library as described above, setting of the analysis conditions can be facilitated. The file name of each file designated in the setting file 201 is displayed in a condition display window 205. The image information regarding the setting file 201 is displayed in a visual window 206 to prevent erroneous input of the setting file 201.

A simulation condition is also set in the setting file 201. For example, information related to imprinting, such as a pressing force for bringing the mold M into contact with the curable composition IM arranged on the substrate S and a time (filling time) of contact between the mold M and the curable composition IM, is set as the simulation condition.

The computational mode is also set in the setting file 201. The computational mode determines the steps of simulation. In accordance with the computational mode, simulation (computation in each step thereof) is executed.

Upon executing the simulation, the user (operator) checks the information displayed in the condition display window 205 and the information displayed in the visual window 206. If there is no problem with the displayed information, for example, the user operates an execution button, and this causes the processor 10 to execute simulation computation in accordance with the simulation program 21. The simulation result created by the simulation computation is stored in the memory 20.

Figure 3:
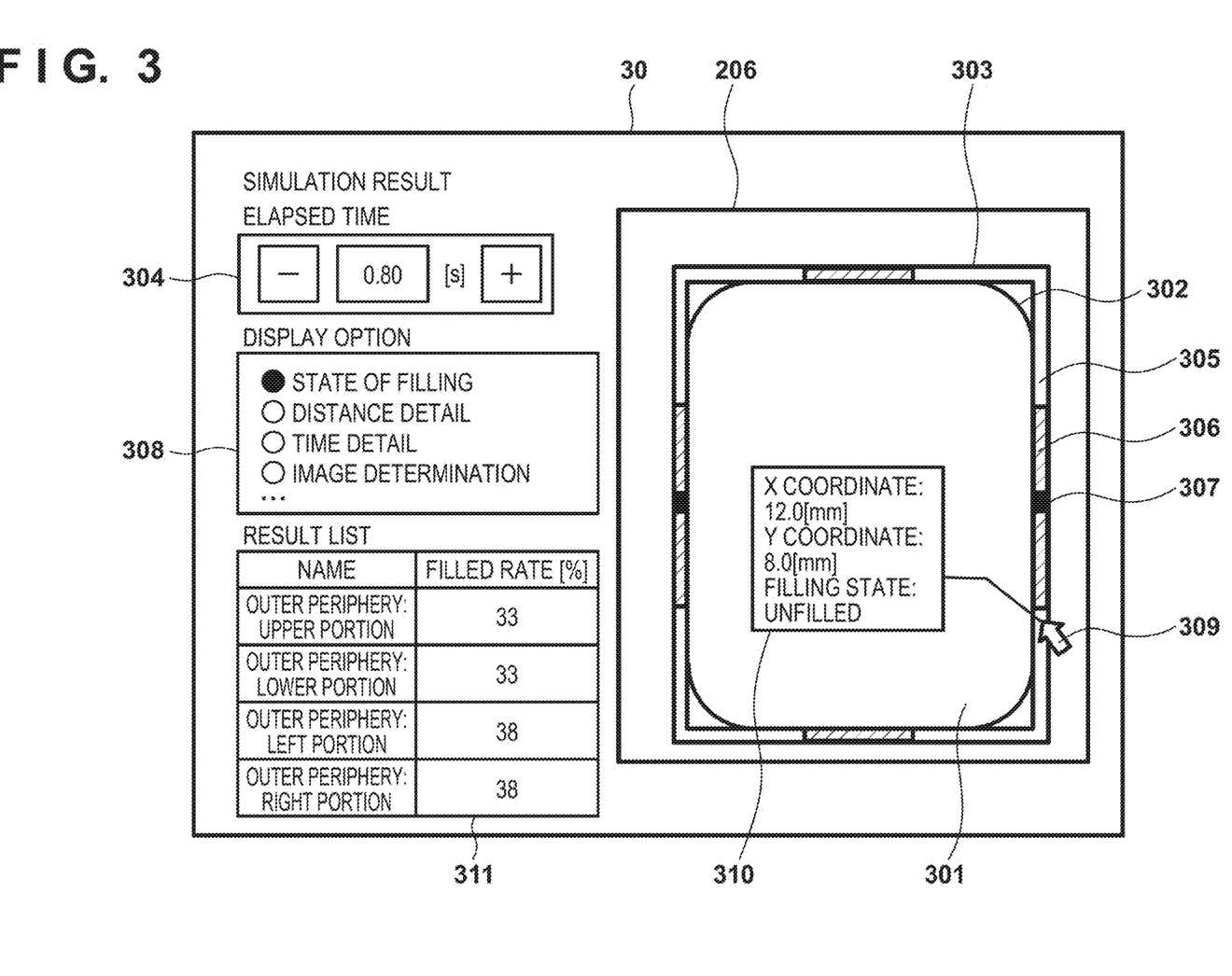
FIG. 3 is a view showing an example of simulation result display.

FIG. 3 shows an example of simulation result display of the user interface provided (displayed) on the display 30 of the information processing apparatus 1. When the user inputs necessary information via the input device 40 while referring to the user interface (FIG. 2) provided on the display 30, the simulated behavior of the curable composition IM is displayed in the visual window 206. In the visual window 206, a simulation image is displayed, which simulates the behavior of the curable composition obtained by the simulation computation, that is, the temporal transition of the phenomenon that the curable composition is spread due to contact between the curable composition and the mold. Note that the simulation result displayed in the visual window 206 is not limited to the size, shape, and number shown in FIG. 3. In accordance with the target to be displayed as the simulation result, the visual window 206 can be displayed on the display 30 by freely changing the size, shape, and number thereof.

A curable composition film 301 is a representation of the film formed by the curable composition IM filled between the mold M and the substrate S, which is computed by filling simulation, as a plane projected onto the X-Y plane. This film is a film formed by the plurality of droplets of the curable composition IM merged in the process of filling, and formed when the mold M radially spreads from the position where the mold first comes into contact with the curable composition IM and the droplets of the curable composition IM are merged. The data of this simulation result is stored in the memory 20.

As shown in FIG. 3, the simulation image displayed in the visual window 206 includes the image of an outer periphery 303 of the shot region where the pattern of the pattern region PR of the mold M is to be transferred, and the image of the edge portion of the film (film edge portion 302). The image of the outer periphery 303 of the shot region and the image of the film edge portion 302 are drawn in a mode that enables visual identification of the position of the outer periphery 303 and the position of the film edge portion 302. The film edge portion 302 indicates the edge portion of the curable composition IM. The outermost parts of the curable composition film 301 is the film edge portion 302, and the position information of the film edge portion 302 with respect to the mold M serves as an index indicating the progress of filling. The film edge portion 302 is represented by a solid line in the visual window 206 so that the operator can visually check it. In the example shown in FIG. 3, the outer periphery 303 of the shot region is represented by a straight line, but it can be formed including a curved line depending on the pattern design of the mold M. The outer periphery 303 of the shot region indicates the target position to fill the curable composition. A state in which the film edge portion 302 reaches the outer periphery 303 of the shot region and stays there is the ideal state of filling.

An elapsed time 304 indicates the elapsed time of the behavior, which is the time in the imprint process. In this example, the contact start time between the droplets and the mold is set at 0 [s] as a reference. This time reference can be arbitrarily changed. In this example, as an example of an operation of changing the elapsed time 304, a minus button and a plus button are arranged on the both sides of the display of the elapsed time 304, respectively, and the time can be changed using them. The elapsed time 304 can be advanced by pressing the plus button, and the elapsed time 304 can be returned by pressing the minus button. By changing the elapsed time 304, the formation status of the curable composition film 301 at the changed time is displayed in the visual window 206.

The curable composition film 301 and the outer periphery 303 of the shot region are relatively aligned and displayed in the visual window 206. Such the display process can be performed by the processor 10. The processor 10 obtains the information of the shape and position of the curable composition film 301 from the simulation result stored in the memory 20. Then, the processor 10 processes the information of the shape and position while referring to the information of the outer periphery 303 of the shot region from the mold design file 202 stored in the memory 20. When the processor 10 performs display control such that the curable composition film 301 and the outer periphery 303 of the shot region are displayed in the same screen, the analysis result and the target outer periphery are displayed in the same screen. With this, the state of filling is visually displayed, and the simulation result reference efficiency is improved.

Further, the processor 10 determines the state of filling, and performs display control of the display 30 so as to display the determination result. The state of filling changes depending on the position of the outer periphery 303 of the shot region. Therefore, displaying the determination result in association with the outer periphery 303 of the shot region makes it possible to refer to the determination result more efficiently. Thus, in this example, the determination result is displayed on the outer periphery of the shot region.

In an example, the determined state of filling can be one of three states of "unfilled", "filled", and "extrusion". "Unfilled" indicates a state in which the film edge portion 302 has not reached the outer periphery 303 of the shot region. "Filled" indicates a state in which the film edge portion 302 has just reached the outer periphery 303 of the shot region. "Extrusion" indicates a state in which the film edge portion 302 has passed through the outer periphery 303 of the shot region. The processor 10 refers to the X and Y coordinate values of the film edge portion 302 and the X and Y coordinate values of the outer periphery 303 of the shot region. The processor 10 determines, from the X and Y coordinate values of the film edge portion 302 and the outer periphery 303, whether the film edge portion 302 is located inside the outer periphery 303 of the shot region, located on the outer periphery 303, or located outside the outer periphery 303, thereby determining the state of filling.

The processor 10 determines the state of filling with respect to the node of the computational grid which is provided on the outer periphery 303 of the shot region and used by the simulation program 21. Since the position information at the X and Y coordinates of the film edge portion 302 is stored as the node solution of the computational grid, setting the node of the computational grid as the determination portion advantageously facilitates grasp of the position information of the film edge portion 302. The interval between the determination portions can be adjusted. For example, it is possible to decrease the interval between the determination portions by interpolating a new computational grid between the nodes of the computational grid, and it is also possible to increase the interval between the determination portions by thinning the node of the computational grid to be used for the determination. Note that the determination result is not limited to the three stages of "unfilled", "filled", and "extrusion", but determination criteria of more than three stages may be defined.

In the example shown in FIG. 3, "unfilled" 305, "filled" 306, and "extrusion" 307 as the determination results are displayed on the outer periphery 303 of the shot region. The determination results are displayed in a mode that enables visual discrimination from each other. For example, the processor 10 controls the display 30 to display respective sub-regions of the outer periphery of the shot region in different colors in accordance with the states of filling so as to enable visual identification of the prediction (determination) result of the state of filling of the curable composition. For example, the determination results are displayed in different colors using colors such as white, block, red, or blue in accordance with the states of filling. Alternatively, the determination result may be identified based on the kind of the line such as a solid line, a dashed line, or an alternate long and short dashed line in accordance with the state of filling.

In the example shown in FIG. 3, the outer periphery 303 of the shot region is displayed while increasing and emphasizing its width. It is displayed so to effectively show the determination result with respect to the outer periphery 303 of the shot region. Note that when the determination result is shown in color, so as not to hinder the display of other simulation results, the line width may be decreased to the extent that visual check is possible.

Note that in the example shown in FIG. 3, the entire outer periphery 303 of the shot region can be seen to generally grasp the state of filling, but the outer periphery 303 of the shot region may be partially enlarged and displayed to obtain more detailed information.

As has been described above, since the position of the film edge portion 302 with respect to the outer periphery 303 of the shot region is visually displayed, it is possible to visually check the state of filling effectively. For example, if the entire shot region is displayed in the visual window 206, the object is displayed on a scale of about several tens of mm in the X direction and the Y direction. For this scale, the scale of the distance between the film edge portion 302 and the outer periphery 303 of the shot region, which should be considered to determine the state of filling, is about several μm. Therefore, it is difficult to check the state of filling in bird's-eye view. On the other hand, according to this embodiment, since the determination result is visually displayed on the outer periphery of the shot region in color or the like, the state of filling can be efficiently grasped. By adding this determination function, the visibility of the result by the operator increases, and the simulation result reference efficiency is improved.

In the example shown in FIG. 3, in order to grasp the above-described determination result of the state of filling in more detail, the simulation result related to the outer periphery 303 of the shot region can be displayed. The information to be displayed can be selected via display options 308 displayed on the display 30. The detailed information of the contents selected in the display options 308 is displayed. In the example shown in FIG. 3, the display options 308 includes four options of "state of filling", "distance detail", "time detail", and "image determination", and they can be selected using, for example, a radio button. Note that the contents and number of the options are merely an example, and not limited thereto. Further, the selection method may be a method other than the radio button. Instead of the radio button selection, for example, check boxes that enable selection of multiple options may be prepared.

For example, as shown in FIG. 3, if "state of filling" is selected in the display options 308, the detailed information of the state of filling is displayed. From this display, the user can effectively grasp the information of the elapsed time and the filled rate, and utilize the information to determine the filling time of the imprint apparatus.

The user can move a cursor 309 displayed on the display 30 by operating the input device 40 to indicate the selection target. When the user moves the cursor 309 to the outer periphery 303 of the shot region and selects and decides the target, a pup-up window 310 appears, and the detailed information at the position on the outer periphery 303 is displayed. According to the example shown in FIG. 3, the position information (the X coordinate value and the Y coordinate value) and the state of filling are displayed in the pop-up window 310. Note that the display contents other than the state of filling displayed in the pop-up window 310 are not limited to the position information, and other contents may be displayed as long as they are related to the determination result of the state of filling. The display contents can be added and changed.

In FIG. 3, the detailed information of the determination result is displayed in a result list 311. Here, the outer periphery 303 of the shot region is divided into four parts of the upper portion, the lower portion, the left portion, and the right portion. The processor 10 performs arithmetic processing while referring to pieces of information of the states of filling in the sub-regions constituting each part, thereby displaying the filled rate of each part. Note that the filled rate is the ratio of the sub-regions determined to be "filled" to a set of sub-regions constituting the part (for example, one side) of the outer periphery 303 of the shot region. That is, the filled rate is expressed as:

filled rate=filled/(unfilled+filled+extrusion)

In the result list 311, not only the information of the determination result obtained by the arithmetic processing for a group as described above but also the determination result of the state of filling unique to each determination portion can be displayed.

In addition, these results can be output as a text file. For example, the information displayed in the result list 311 can be stored in a predetermined region of the memory in a CSV file format.

In this manner, by displaying the result visually representing the determination result together with the detailed information, the simulation result reference efficiency can be further improved.

According to this embodiment, since the simulation result reference efficiency is improved by the display method for visually checking the state of filling, it is possible to effectively check the state of filling of the curable composition in the outer periphery of the shot region.

Note that, based on the simulation result obtained in the information processing apparatus 1, the imprint settings of the film forming apparatus IMP can be modified as appropriate. With this, more appropriate imprint condition can be set.

Second Embodiment

Figure 4:
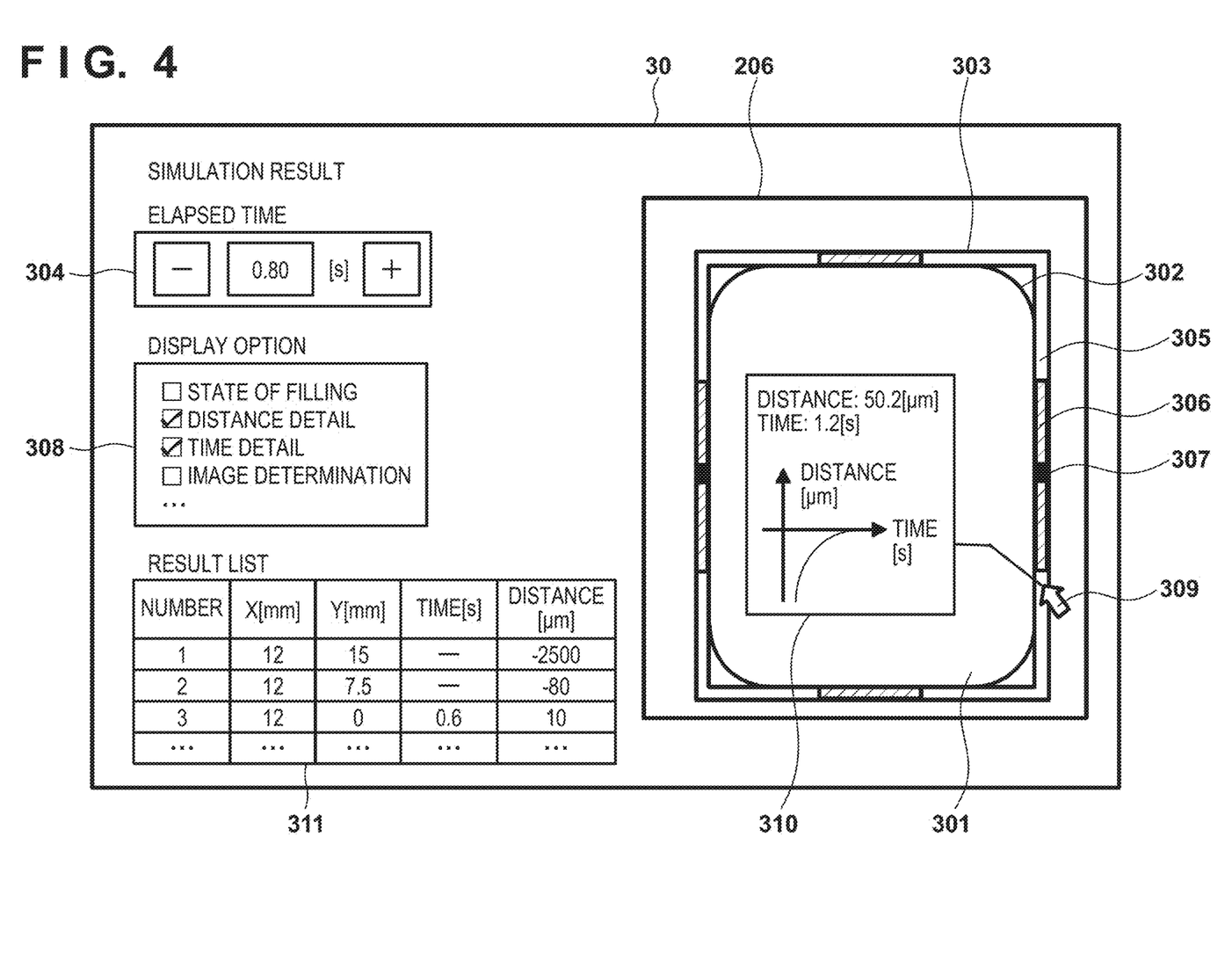
FIG. 4 is a view showing another example of simulation result display.

With reference FIG. 4, an information processing apparatus according to the second embodiment will be described. In this embodiment, determining the state of filling from the position information of a film edge portion 302 and the position information of an outer periphery 303 of the shot region, and displaying the determination result are similar to those in the first embodiment, so that a description thereof will be omitted. Also in other parts, a description of the contents already described in the first embodiment will be omitted.

display options 308 in this embodiment enable selection of the detailed information to be displayed by check boxes. The operator performs selection using an input device 40. It is possible to select multiple options using the check boxes. In the example shown in FIG. 4, "time detail" and "distance detail" are selected.

"Distance detail" indicates the distance from the outer periphery 303 to the film edge portion 302 in a sub-region of the outer periphery 303 of the shot region. The distance is expressed by, for example, the shortest distance in the X direction and the Y direction from a reference position provided in the outer periphery 303 of the shot region to the film edge portion 302. If the distance value is negative, it indicates unfilled, and if the distance value is positive, it indicates extrusion. However, the definition of the distance is not limited to this example, and the operator can freely change the definition. For example, for an evaluation point corresponding to the extrusion 307, the distance may indicate the distance that the film edge portion 302 is moved in the Z direction due to extrusion.

"Time detail" indicates the information of the elapsed time concerning the state of filling. For example, the contact start time between the droplets and the mold is set at 0 [s] as a reference, and a shortest elapsed time 304 required for the states of filling of the respective portions to be determined as "filled" is defined as the time information. Note that, similar to the distance, the definition of the time information is not limited to this example, and the operator can freely change the definition. For example, the elapsed time 304 immediately before extrusion starts may be defined as the time information.

When a cursor 309 is moved to the outer periphery 303 of the shot region and the target is selected and decided, a pop-up window 310 appears, and the distance and the time information at the selected determination portion (sub-region) are displayed. Further, in the example shown in FIG. 4, a graph illustrating the temporal change of the distance between the outer periphery 303 and the film edge portion 302 is displayed. With this display method, the behavior of the distance at each elapsed time 304 can be visually checked. Thus, the result reference efficiency is improved.

Detailed information concerning the determination portion is displayed in a result list 311. In the example shown in FIG. 4, pieces of information of all sub-regions set in the outer periphery 303 of the shot region are displayed as a list. Since the number of display rows is limited, the display row may be changed by moving a scroll bar or the like. Further, as has been described in the first embodiment, the information displayed in the result list 311 can be output as a text file.

In this manner, also in this embodiment, by simultaneously displaying the result visually representing the determination result and multiple pieces of different detailed information, the simulation result reference efficiency can be further improved.

According to this embodiment, since the simulation result reference efficiency is improved by the display method for visually checking the state of filling, it is possible to effectively check the state of filling in the outer periphery of the shot region.

Note that, based on the simulation result obtained in an information processing apparatus 1, the imprint settings of a film forming apparatus IMP can be modified as appropriate. With this, more appropriate imprint condition can be applied.

Third Embodiment

With reference FIG. 5, an information processing apparatus according to the third embodiment will be described. In this embodiment, determining the state of filling from the position information of a film edge portion 302 and the position information of an outer periphery 303 of the shot region, and displaying the determination result are similar to those in the first and second embodiments, so that a description thereof will be omitted. Also in other parts, a description of the contents already described in the first and second embodiments will be omitted.

In this embodiment, a case will be described in which image determination is selected in the display options 308. In this embodiment, a film forming apparatus IMP has a function of capturing a film of a curable composition IM formed by performing a formation process. An alignment scope AS may be used to capture the film, or a dedicated image capturing apparatus may be used. Alternatively, the film may be captured outside the film forming apparatus IMP using a microscope or the like.

When "image determination" is selected in the display options 308, an input unit 55 for designating the image information to be referred to is displayed. A user can input the image information to the input unit 55. The image information can include the captured image of a curable composition film 301 formed by the actual formation process, and its position and scale information. A processor 10 adjusts the scale and position between the captured image of the curable composition film 301 and the outer periphery 303 of the shot region while referring to the image information, and displays the captured image.

At this time, the arrangement information of droplets of the curable composition IM on a substrate S may be also displayed on a display 30. Since the discharge amounts and arrangement information of droplets are described in a droplet arrangement file 204, an image can be formed while referring to this information. By referring to the arrangement of droplets of the curable composition IM together with the determination result of the state of filling, this can be utilized to decide the droplet arrangement upon creating the droplet arrangement file 204.

In the film formation apparatus IMP, the vicinity of the outer periphery 303 of the shot region is enlarged and captured. Accordingly, it is expected that a plurality of captured images are obtained. In the example shown in FIG. 5, a sub-image 501a, a sub-image 501b, a sub-image 501c, and a sub-image 501d are connected to create a captured image 501 of the shot region. The processor 10 controls the display 30 so as to superimpose and display the simulation image and the captured image 501. In FIG. 5, since the sub-images forming the captured image 501 overlap the curable composition film 301 and the outer periphery 303 of the shot region, it is preferable to perform a contrivance to display one of the simulation image and the captured image 501 semi-transparently or the like. In an example, the curable composition film 301 of the simulation image is displayed semi-transparently. With this, the captured image 501 in the background is displayed in a manner that it can be checked.

Figure 5:
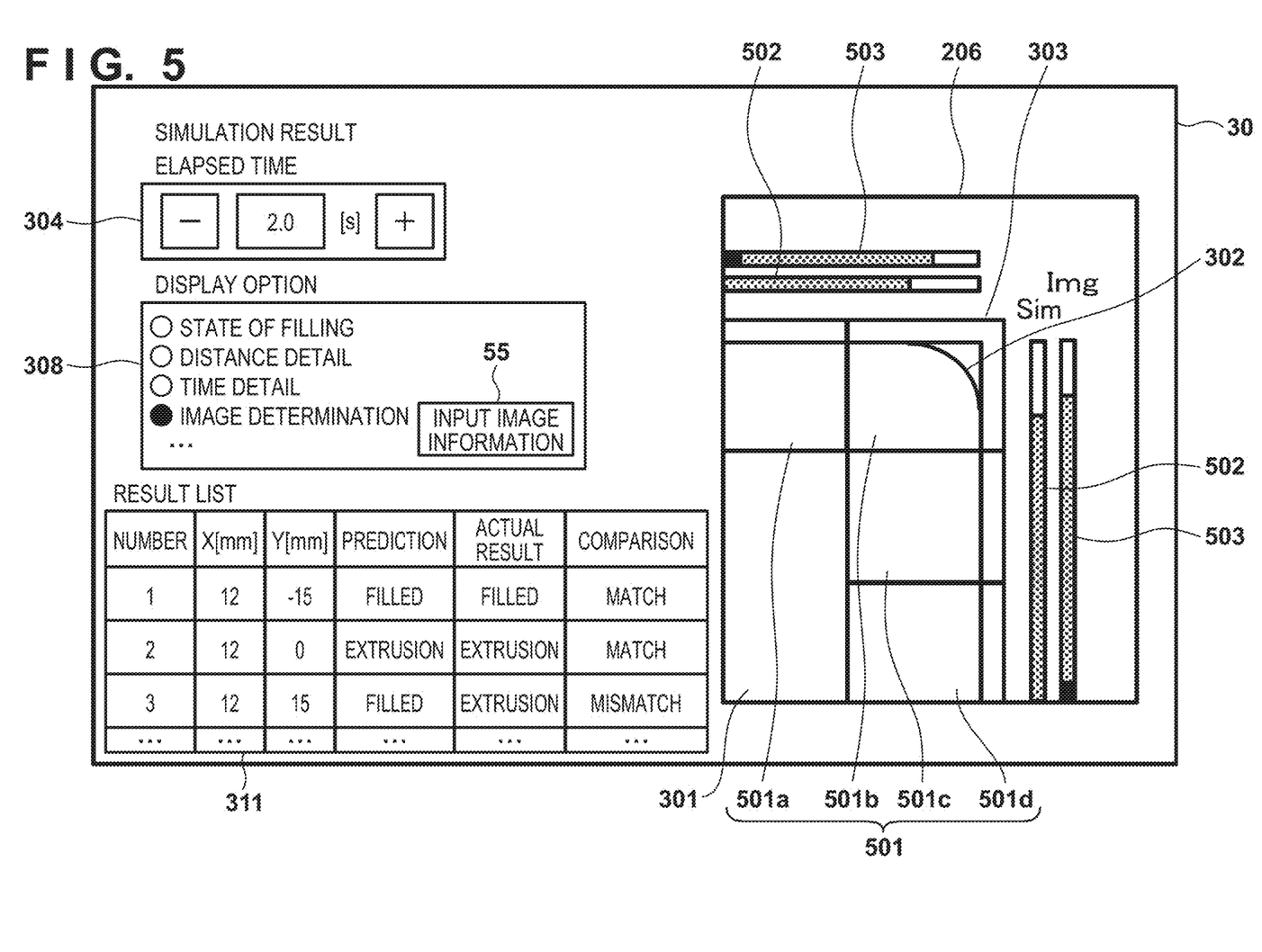
FIG. 5 is a view showing still another example of simulation result display.

In the example shown in FIG. 5, "unfilled", "filled", and "extrusion" as determination results by simulation are displayed in a simulated determination result 502. In the first and second embodiments, the determination result is displayed on the outer periphery 303 of the shot region, but in this embodiment, the determination result is displayed away from the outer periphery 303 of the shot region.

"Unfilled", "filled", and "extrusion" as the image determination results (the determination results with respect to the captured image) of the curable composition film actually formed by the imprint apparatus IMP are displayed in an image determination result 503. Note that the image determination may be performed visually by the operator, or may be performed by automatic determination using image processing.

In this embodiment, for each sub-region of the outer periphery 303 of the shot region, the predicted result (simulated determination result 502) of the state of filling using the simulation image and the image determination result 503 are displayed. For example, as shown in FIG. 5, the simulated determination result 502 and the image determination result 503 are arranged near the outer periphery 303 of the shot region and displayed in different colors in accordance with the states of filling. Therefore, the state of filling shown in the image 501 is readily checked, and two determination results are easily compared. In this manner, the simulated state of filling and the state of filling according to the actual imprinting can be effectively compared, and the difference between the analysis result and the actual phenomenon becomes clear. Thus, feedback to the analysis conditions can be effectively performed.

Also in this embodiment, detailed information concerning the determination portion is displayed in a result list 311. Pieces of information of all determination portions set in the outer periphery 303 of the shot region are displayed as a list. Since the number of display rows is limited, the display row may be changed by moving a scroll bar or the like. In the result list 311 shown in FIG. 5, the state of filling of the simulated determination result 502 is displayed in the "prediction" item, and the state of filling of the image determination result 503 is displayed in the "actual result" item, and match/mismatch between the both determination results is displayed in the "comparison" item. Owing the list display as described above, the simulation result can be efficiently evaluated.

According to this embodiment, since the simulation result reference efficiency is improved by the display method for visually checking the state of filling, it is possible to effectively check the state of filling in the outer periphery of the shot region.

Note that, based on the simulation result obtained in an information processing apparatus 1, the imprint settings of the film forming apparatus IMP can be modified as appropriate. With this, more appropriate imprint condition can be applied.

Fourth Embodiment

Figure 6A:
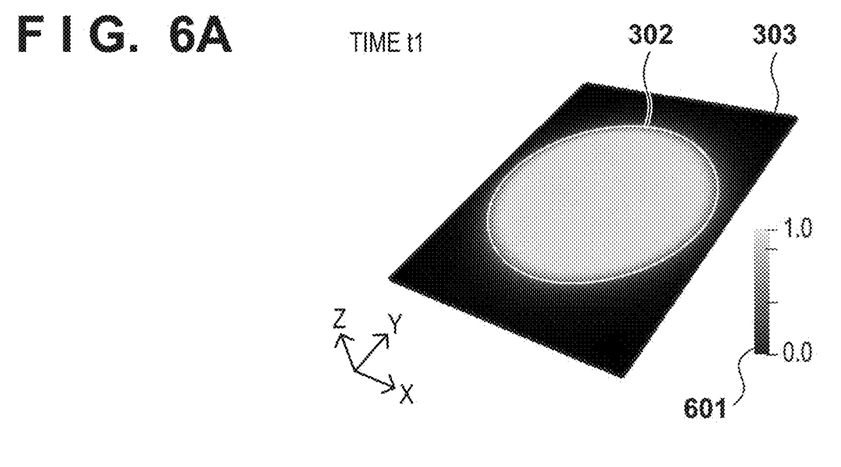
FIGS. 6A to 6C are views showing examples of simulation result display in time-series.
Figure 6B:
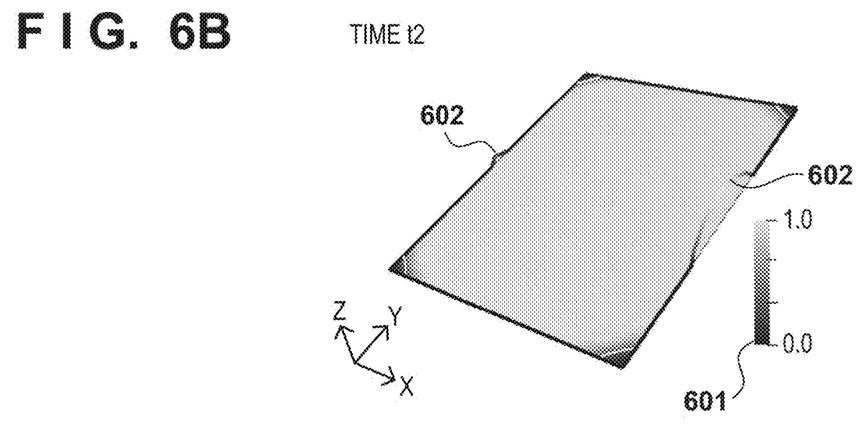
Figure 6C:
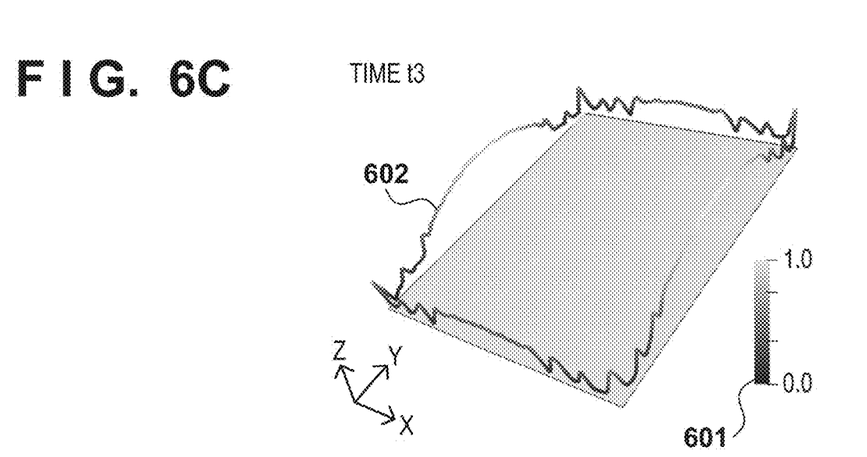
Figure 7A:
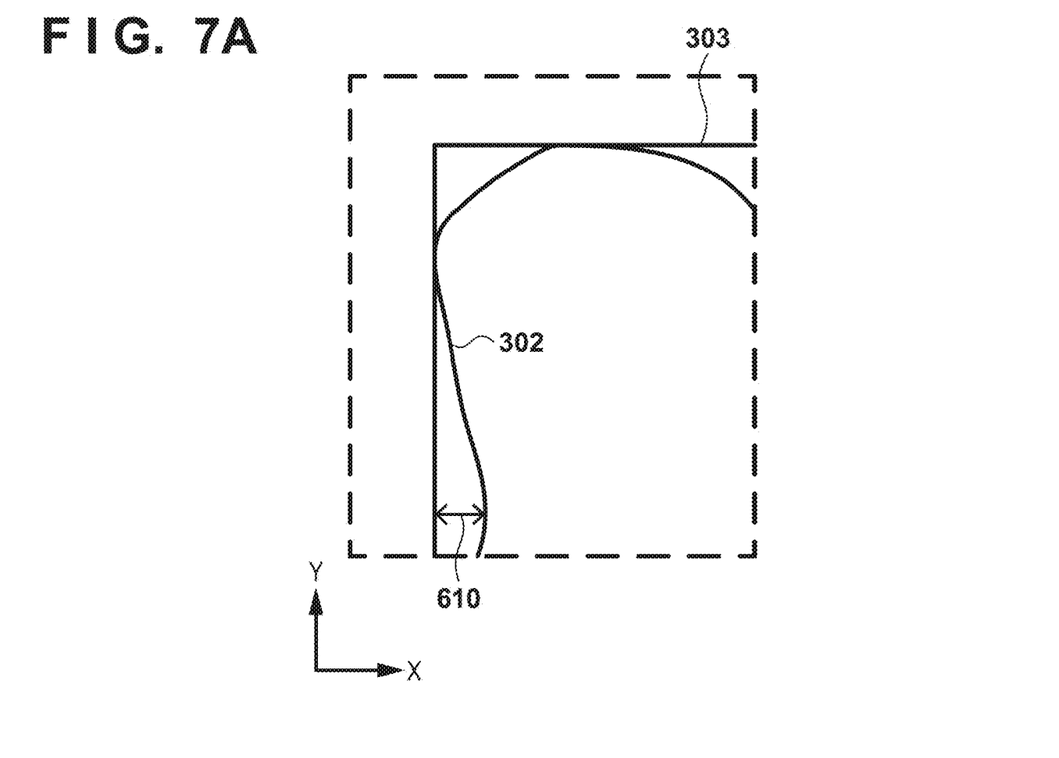
FIG. 7A is a view showing an example of unfilled.
Figure 7B:
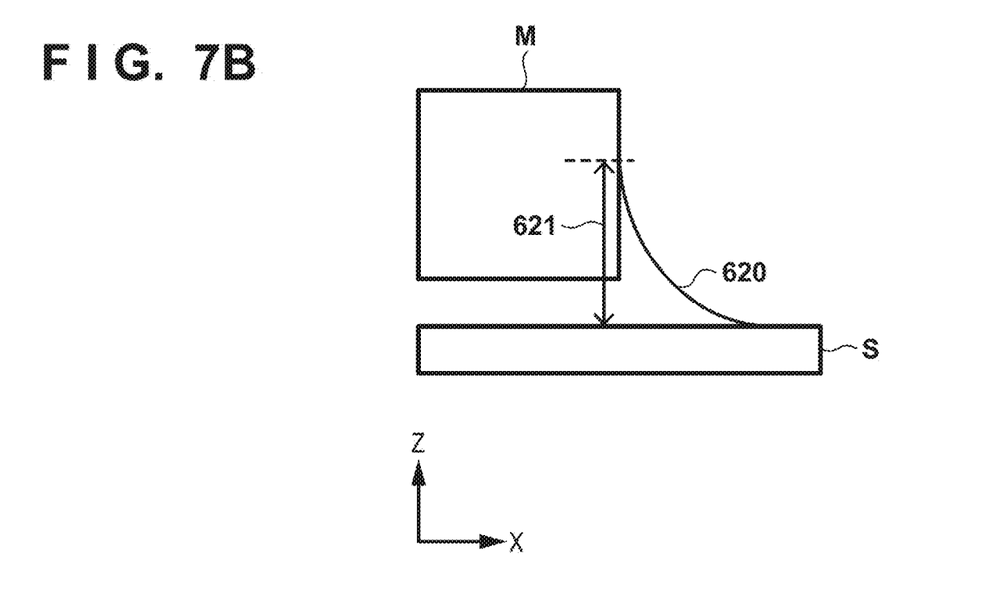
FIG. 7B is a view showing an example of extrusion.
Figure 8A:
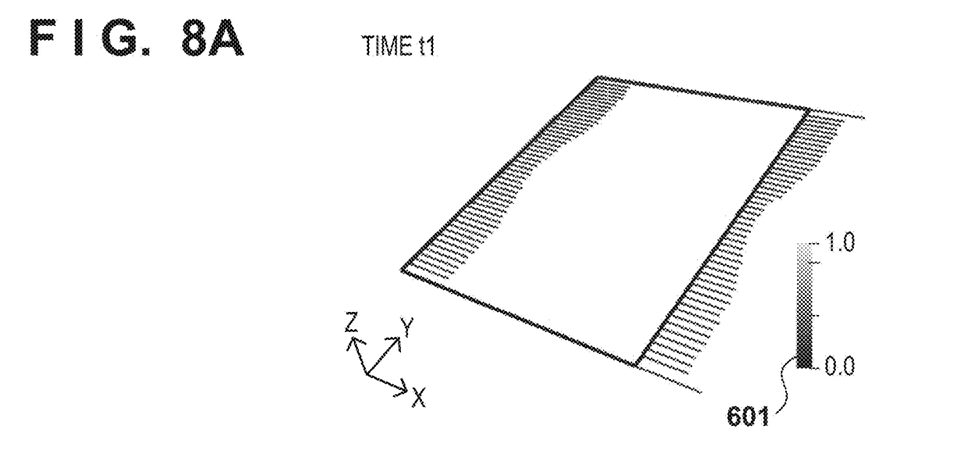
FIGS. 8A to 8C are views showing examples of simulation result display in time-series.
Figure 8B:
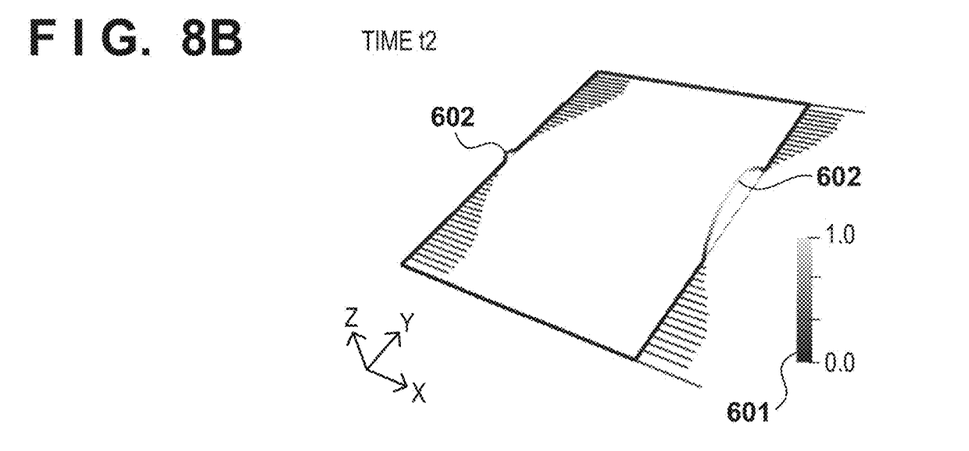
Figure 8C:
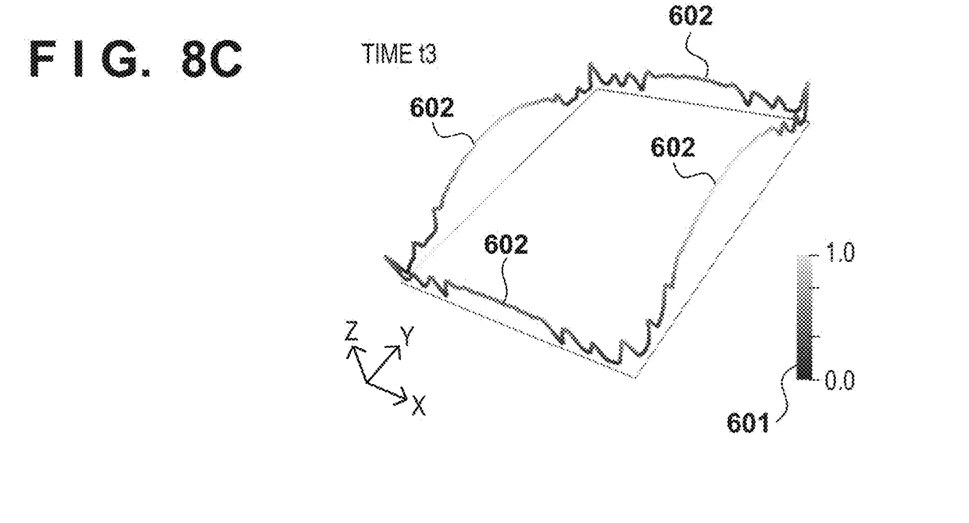

Next, another example of the display method of the simulation result displayed in a visual window 206 will be described. FIGS. 6A to 6C display examples of simulation results in time-series. FIG. 6A shows the simulation result at time t1, FIG. 6B shows the simulation result at time t2, and FIG. 6C shows the simulation result at time t3 (t1<t2<t3). A three-dimensional image as the simulation result is shown in each of FIGS. 6A to 6C. FIG. 7A is a view showing unfilled/extrusion, and FIG. 7B is a sectional view showing a mold M and a substrate S at the time when extrusion occurs. FIGS. 8A to 8C show other examples of displaying the simulation results as three-dimensional images. FIG. 8A shows the simulation result at time t1, FIG. 8B shows the simulation result at time t2, and FIG. 8C shows the simulation result at time t3 (t1<t2<t3).

In an example, the image display mode in the visual window 206 can be switched between a two-dimensional image and a three-dimensional image by user selection. FIGS. 6A to 6C show the images in a case in which a three-dimensional image is selected. FIG. 6A shows a state at time t1 halfway through filling at the position of a film edge portion 302. FIG. 6B shows a state at time t2 in which parts of the film edge portion 302 reach an outer periphery 303 of the shot region and extrusion occurs in some regions. FIG. 6C shows a state at time t3 in which filling is complete.

If extrusion occurs, as shown in FIGS. 6B and 6C, a line graph representing the extrusion amount at each position is displayed on the outer periphery 303 of the shot region. Owing to the displays shown in FIGS. 6A to 6C, the user can easily visually recognize the progress of filling. Further, since the line graph appears as shown in FIGS. 6B and 6C if extrusion occurs, the user can easily grasp the distribution of extrusion. Note that the type of the graph may be not the line graph shown in FIG. 6C but another graph display format as long as the filling status can be easily identified on the simulation image.

In a case of the positional relationship between the outer periphery 303 of the shot region and the film edge portion 302 as shown in FIG. 7A, an unfilled distance 610, which is the distance from the film edge portion 302 to the outer periphery 303, exists in an "unfilled" portion. In the filling simulation, the unfilled distance 610 shown in FIG. 7A can be computed at each position in the outer periphery 303.

In an "extrusion" portion as shown in FIG. 7B, an interface 620 of a curable composition IM extruding from the outer periphery 303 of the shot region exists. Therefore, in the filling simulation, an extrusion height 621 can be computed at each position in the outer periphery 303. The extrusion height 621 is the distance (height) between the surface of the substrate S and the position where the interface of the curable composition IM extruding between the mold M and the substrate S is in contact with the mold M.

As shown in FIGS. 6A to 6C, by displaying the film edge portion 302, the unfilled distance 610 can be identified and displayed as the distance to the outer periphery 303. In order to improve the visibility of the film edge portion 302, an unfilled area may be displayed in black as shown in FIG. 6A. Alternatively, as shown in FIGS. 8A and 8B, the unfilled distance may be displayed in a bar graph. FIGS. 8A and 8B show an example in which the bar graphs extend in the +X direction only from two sides on the X-direction edges, respectively, but the bar graph on the right side may be displayed to extend in the −X direction. Alternatively, bar graphs extending in the Y direction from two sides on the Y-direction edges, respectively, may be displayed as well. Bar graphs extending not in the X and Y directions but in the Z direction may be displayed. Further, the line graphs or the bar graphs may be displayed in different colors in accordance with the extrusion amounts or the unfilled distances. With visual display as described above, it is possible to efficiently identify the progress of filling.

In an example, line graphs 602 that appear in FIGS. 6B and 6C can be displayed in different colors to show the difference between the extrusion heights 621 at respective positions. The correspondence between the color and the extrusion height is defined by a color bar 601. The user can easily check the relative relationship between the extrusion heights 621 at respective positions using the line graphs 602. Further, the user can check the specific value of the extrusion height 621 at a position of interest by referring to the color bar 601 regarding the color at the position of interest.

In this manner, by visually displaying the line graph 602 on the outer periphery of the shot region, the user can efficiently identify the extrusion status. Note that, since the computed value of the extrusion height 621 is very small, the visibility of the graph may be improved by displaying the line graph 602 based on the adjusted value obtained by multiplying the computed value by a predetermined magnification. Note that in the examples shown in FIGS. 6B, 6C, 8B, and 8C, both of displaying the line graphs and displaying them in different colors are performed, but only one of them may be performed.

For a "filled" portion, if the unfilled distance 610 is not larger than an allowable value and the extrusion height 620 is not larger than an allowable value, the portion (which almost matches the outer periphery of the shot region in this case) on the graph may be emphasized and displayed.

According to this embodiment, since the simulation result reference efficiency is improved by the display method for visually checking the state of filling, it is possible to effectively check the state of filling in the outer periphery of the shot region.

Based on the simulation result obtained in an information processing apparatus 1, the imprint settings of a film forming apparatus IMP can be modified as appropriate. With this, more appropriate imprint condition can be applied.

In each of the above-described first to fourth embodiments, the example in which the simulation result is displayed as the simulation image in the visual window 206 has been described, but the result data stored in the memory 20 may be displayed using another display apparatus. That is, the processor 10 may compute data of the simulation image that enables a visual check of the state of filling, and output the data to the memory 20.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The disclosure of this specification includes at least a simulation apparatus, a control method of the simulation apparatus, and a computer-readable storage medium described below.
(Item 1)
A simulation apparatus that predicts a behavior of a curable composition in a formation process in which the curable composition arranged on a shot region of a substrate and a mold are brought into contact with each other to form a film of the curable composition on the shot region, the apparatus comprising:
an obtaining unit configured to obtain a condition concerning a simulation of the formation process; and
a processor configured to obtain the behavior of the curable composition by simulation computation based on the obtained condition, and output data used to display a simulation image simulating the behavior obtained by the simulation computation,
wherein the simulation image includes information of an outer periphery of the shot region and information of an edge portion of the film, which are drawn in a mode that enables visual identification of a position of the edge portion of the film with respect to the outer periphery.
(Item 2)
The apparatus according to the Item 1, wherein
the processor outputs the data used for one of color-coded display and graph display of the outer periphery in accordance with a state of filling to enable visual identification of a prediction result of the state of filling of the curable composition for each sub-region.
(Item 3)
The apparatus according to the Item 2, wherein
the processor determines, for each sub-region of the outer periphery, as the state of filling, one of an unfilled state indicating a state in which the edge portion of the film has not reached the outer periphery, a filled state indicating that the edge portion of the film has reached the outer periphery, and an extrusion indicating that the edge portion of the film has passed through the outer periphery, and outputs the data used for one of the color-coded display and the graph display.
(Item 4)
The apparatus according to the Item 3, wherein
the processor further outputs the data used to display a filled rate indicating a ratio of the sub-region determined to be the filled state to a set of the sub-regions constituting one side of the outer periphery.
(Item 5)
The apparatus according to any one of the Items 1 to 4, wherein
the processor further outputs the data used to display an elapsed time of the behavior.
(Item 6)
The apparatus according to any one of the Items 1 to 5, wherein
the processor further outputs, for each sub-region of the outer periphery, the data used to display a distance from the outer periphery to the edge portion of the film.
(Item 7)
The apparatus according to any one of the Items 1 to 6, wherein
the processor further outputs the data used to display a graph showing a change in distance between the outer periphery and the edge portion of the film with respect to an elapsed time of the behavior.
(Item 8)
The apparatus according to the Item 2, wherein
the processor outputs the data used to superimpose and display the simulation image and a captured image obtained by capturing a film formed by performing the formation process in a film forming apparatus.
(Item 9)
The apparatus according to the Item 8, wherein
the processor further outputs the data used to display, for each sub-region of the outer periphery, the prediction result of the state of filling of the curable composition using the simulation image, and a determination result of the state of filling of the curable composition with respect to the captured image.

(Item 10)

The apparatus according to the Item 9, wherein the processor outputs the data used for one of color-coded display and graph display in accordance with the state of filling while arranging the prediction result and the determination result for each sub-region.

(Item 11)

The apparatus according to the Item 9 or 10, wherein the processor outputs the data used to further display information indicating match/mismatch between the prediction result and the determination result for each sub-region.

(Item 12)

A simulation apparatus that predicts a behavior of a curable composition in a formation process in which the curable composition arranged on a shot region of a substrate and a mold are brought into contact with each other to form a film of the curable composition on the shot region, the apparatus comprising:

an obtaining unit configured to obtain a condition concerning a simulation of the formation process; and a processor configured to obtain the behavior of the curable composition by simulation computation based on the obtained condition, and control a display unit so as to display a simulation image simulating the behavior obtained by the simulation computation, wherein the simulation image includes an image of an outer periphery of the shot region and an image of an edge portion of the film, which are drawn in a mode that enables visual identification of a position of the edge portion of the film with respect to the outer periphery.

(Item 13)

A control method of a simulation apparatus that predicts a behavior of a curable composition in a formation process in which the curable composition arranged on a shot region of a substrate and a mold are brought into contact with each other to form a film of the curable composition on the shot region, the method comprising obtaining a condition concerning a simulation of the formation process; and obtaining the behavior of the curable composition by simulation computation based on the obtained condition, and outputting data used to display a simulation image simulating the behavior obtained by the simulation computation, wherein the simulation image includes an image of an outer periphery of the shot region and an image of an edge portion of the film, which are drawn in a mode that enables visual identification of a position of the edge portion of the film with respect to the outer periphery.

(Item 14)

A computer-readable storage medium storing a program for causing a computer to function as a processor in a simulation apparatus defined in any one of the Items 1 to 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-163067, filed Oct. 1, 2021, and No. 2022-112574, filed Jul. 13, 2022, which are hereby incorporated by reference herein in their entirety.

What is claimed is:

1. A simulation apparatus that predicts a behavior of a curable composition in a formation process in which the curable composition arranged on a shot region of a substrate and a mold are brought into contact with each other to form a film of the curable composition on the shot region, the apparatus comprising:

an obtaining unit configured to obtain a condition concerning a simulation of the formation process; and a processor configured to obtain the behavior of the curable composition by simulation computation based on the obtained condition, and output data used to display a simulation image simulating the behavior obtained by the simulation computation, the data being used for one of a color-coded display or a graph display of an outer periphery of the shot region in accordance with a state of filling to enable visual identification of a prediction result of the state of filling of the curable composition for each sub-region to assist an adjustment operation for actual formation condition, wherein the simulation image includes information of the outer periphery of the shot region and information of an edge portion of the film, which are drawn in a mode that enables visual identification of a position of the edge portion of the film with respect to the outer periphery, wherein the processor determines, for each sub-region of the outer periphery, as the state of filling, one of (1) an unfilled state indicating a state in which the edge portion of the film has not reached the outer periphery, (2) a filled state indicating that the edge portion of the film has reached the outer periphery, or (3) an extrusion indicating that the edge portion of the film has passed through the outer periphery, and wherein the data output by the processor is further used to display a filled rate indicating a ratio of the sub-region determined to be in the filled state to a set of the sub-regions constituting one side of the outer periphery.

2. The apparatus according to claim 1, wherein the processor further outputs the data used to display an elapsed time of the behavior.

3. The apparatus according to claim 1, wherein the processor further outputs, for each sub-region of the outer periphery, the data used to display a distance from the outer periphery to the edge portion of the film.

4. The apparatus according to claim 1, wherein the processor further outputs the data used to display a graph showing a change in distance between the outer periphery and the edge portion of the film with respect to an elapsed time of the behavior.

5. The apparatus according to claim 1, wherein the processor outputs the data used to superimpose and display the simulation image and a captured image obtained by capturing a film formed by performing the formation process in a film forming apparatus.

6. The apparatus according to claim 5, wherein the processor further outputs the data used to display, for each sub-region of the outer periphery, the prediction result of the state of filling of the curable composition using the simulation image, and a determination result of the state of filling of the curable composition with respect to the captured image.

7. The apparatus according to claim 6, wherein the processor outputs the data used for one of color-coded display and graph display in accordance with the state of filling while arranging the prediction result and the determination result for each sub-region.

8. The apparatus according to claim 6, wherein
the processor outputs the data used to further display information indicating match/mismatch between the prediction result and the determination result for each sub-region.

9. A simulation apparatus that predicts a behavior of a curable composition in a formation process in which the curable composition arranged on a shot region of a substrate and a mold are brought into contact with each other to form a film of the curable composition on the shot region, the apparatus comprising:
an obtaining unit configured to obtain a condition concerning a simulation of the formation process; and
a processor configured to obtain the behavior of the curable composition by simulation computation based on the obtained condition, and control a display unit so as to display a simulation image simulating the behavior obtained by the simulation computation based on output data, the output data being used for display of an outer periphery of the shot region in accordance with a state of filling to enable visual identification of a prediction result of the state of filling of the curable composition for each sub-region to assist an adjustment operation for actual formation condition,
wherein the simulation image includes information of the outer periphery of the shot region and information of an edge portion of the film, which are drawn in a mode that enables visual identification of a position of the edge portion of the film with respect to the outer periphery,
wherein the processor determines, for each sub-region of the outer periphery, as the state of filling, one of (1) an unfilled state indicating a state in which the edge portion of the film has not reached the outer periphery, (2) a filled state indicating that the edge portion of the film has reached the outer periphery, or (3) an extrusion indicating that the edge portion of the film has passed through the outer periphery, and
wherein the data output by the processor is further used to display a filled rate indicating a ratio of the sub-region determined to be in the filled state to a set of the sub-regions constituting one side of the outer periphery.

10. A control method of a simulation apparatus that predicts a behavior of a curable composition in a formation process in which the curable composition arranged on a shot region of a substrate and a mold are brought into contact with each other to form a film of the curable composition on the shot region, the method comprising:
obtaining a condition concerning a simulation of the formation process; and
obtaining the behavior of the curable composition by simulation computation based on the obtained condition, and outputting data used to display a simulation image simulating the behavior obtained by the simulation computation, the data being used for one of a color-coded display or a graph display of an outer periphery of the shot region in accordance with a state of filling to enable visual identification of a prediction result of the state of filling of the curable composition for each sub-region to assist an adjustment operation for actual formation condition,
wherein the simulation image includes information of the outer periphery of the shot region and information of an edge portion of the film, which are drawn in a mode that enables visual identification of a position of the edge portion of the film with respect to the outer periphery,
wherein the method further includes determining, for each sub-region of the outer periphery, as the state of filling, one of (1) an unfilled state indicating a state in which the edge portion of the film has not reached the outer periphery, (2) a filled state indicating that the edge portion of the film has reached the outer periphery, or (3) an extrusion indicating that the edge portion of the film has passed through the outer periphery, and using the data to display a filled rate indicating a ratio of the sub-region determined to be the filled state to a set of the sub-regions constituting one side of the outer periphery.

11. A non-transitory computer-readable storage medium storing a program for causing a computer to function as a processor in a simulation apparatus defined in claim 1.

* * * * *